(12) United States Patent
Sabys et al.

(10) Patent No.: US 7,081,158 B2
(45) Date of Patent: Jul. 25, 2006

(54) INK COMPOSITION FOR CONTINUOUS DEFLECTED JET PRINTING, ESPECIALLY ON LETTERS AND POSTAL ARTICLES

(75) Inventors: Jean-Yves Sabys, La Roche de Glun (FR); Pierre de Saint-Romain, Valence (FR)

(73) Assignee: Imaje S.A., Bourg-les-Valence (FR)

( * ) Notice: Subject to any disclaimer, the term of this patent is extended or adjusted under 35 U.S.C. 154(b) by 147 days.

(21) Appl. No.: 10/717,663

(22) Filed: Nov. 21, 2003

(65) Prior Publication Data

US 2005/0113481 A1 May 26, 2005

(51) Int. Cl.
*C09D 11/02* (2006.01)

(52) U.S. Cl. .............................. 106/31.58; 106/31.86; 106/31.41; 106/31.37; 106/31.69; 106/31.72

(58) Field of Classification Search ............ 106/31.58, 106/31.86, 31.41, 31.37, 31.69, 31.72
See application file for complete search history.

(56) References Cited

U.S. PATENT DOCUMENTS

| | | | |
|---|---|---|---|
| 4,024,096 A | 5/1977 | Wachtel | |
| 4,153,593 A | 5/1979 | Zabiak et al. | |
| 4,155,767 A | 5/1979 | Specht et al. | |
| 4,155,895 A | 5/1979 | Rohowetz et al. | |
| 4,166,044 A | 8/1979 | Germonprez et al. | |
| 4,210,566 A | 7/1980 | Murray | |
| 4,260,531 A | 4/1981 | Wachtel et al. | |
| 4,281,329 A | 7/1981 | Yano et al. | |
| 4,290,072 A | 9/1981 | Mansukhani | |
| 4,465,800 A | 8/1984 | Bhatia | |
| 4,567,213 A | 1/1986 | Bhatia et al. | |
| 4,756,758 A | 7/1988 | Lent et al. | |
| 4,834,799 A | 5/1989 | Song | |
| 4,880,465 A | 11/1989 | Loria et al. | |
| 5,098,477 A * | 3/1992 | Vieira et al. .............. 106/31.27 | |
| 5,102,458 A | 4/1992 | Lent et al. | |
| 5,122,187 A | 6/1992 | Schwarz et al. | |
| 5,143,546 A * | 9/1992 | Yuasa et al. .............. 106/31.58 | |
| 5,316,575 A | 5/1994 | Lent et al. | |
| 5,395,431 A | 3/1995 | Siddiqui et al. | |
| 5,395,432 A | 3/1995 | Nelson et al. | |
| 5,453,122 A | 9/1995 | Lyon | |
| 5,466,287 A | 11/1995 | Lyon | |
| 5,593,486 A | 1/1997 | Oliver et al. | |
| 5,594,044 A | 1/1997 | Yang | |
| 5,637,139 A | 6/1997 | Morelos et al. | |
| 5,652,286 A | 7/1997 | Deng | |
| 5,885,338 A | 3/1999 | Nigam et al. | |
| 5,936,027 A | 8/1999 | Zahrobsky et al. | |
| 5,998,502 A | 12/1999 | Burr et al. | |
| 6,010,564 A * | 1/2000 | Zhu et al. ................. 106/31.37 | |
| 6,086,661 A | 7/2000 | Malhotra et al. | |
| 6,432,184 B1 | 8/2002 | Malhotra et al. | |
| 6,444,020 B1 | 9/2002 | Seto et al. | |
| 6,460,957 B1 | 10/2002 | Quintens et al. | |
| 6,501,587 B1 | 12/2002 | Ferraris et al. | |
| 6,527,387 B1 | 3/2003 | Lawrence et al. | |
| 6,527,844 B1 | 3/2003 | Erdtmann et al. | |
| 6,533,408 B1 | 3/2003 | Erdtmann et al. | |
| 6,534,566 B1 | 3/2003 | Chen et al. | |
| 6,554,418 B1 | 4/2003 | Lawrence et al. | |
| 6,555,168 B1 | 4/2003 | Chen et al. | |
| 6,558,770 B1 | 5/2003 | Lehmann et al. | |
| 6,559,245 B1 | 5/2003 | Mao et al. | |
| 6,568,795 B1 | 5/2003 | Sharma et al. | |
| 6,726,756 B1 * | 4/2004 | Zou et al. ................. 106/31.57 | |
| 6,824,260 B1 * | 11/2004 | Blease et al. .................. 347/86 | |
| 2003/0119943 A1* | 6/2003 | Tucker et al. ............... 523/160 | |
| 2004/0150702 A1* | 8/2004 | Tsuyoshi et al. ............ 347/100 | |

FOREIGN PATENT DOCUMENTS

| | | |
|---|---|---|
| EP | 0 034 881 A1 | 9/1981 |
| EP | 0 289 141 A2 | 11/1988 |
| EP | 0 510 752 A1 | 10/1992 |
| EP | 0 735 120 A2 | 10/1996 |
| FR | 2 460 982 | 1/1981 |
| GB | 2 277 094 A | 10/1994 |
| GB | 2 286 402 A | 8/1995 |
| GB | 2 298 713 A | 9/1996 |
| WO | WO 92/14794 | 9/1992 |
| WO | WO 92/14795 | 9/1992 |
| WO | WO 95/29287 | 11/1995 |
| WO | WO 96/23844 | 8/1996 |

OTHER PUBLICATIONS

Anonymous, "Non-toxic non aq. Ink jet ink-contains propylene carbonate which is good solvent for dyes and polymers, and has low viscosity", Research Disclosure, vol. 321, No. 020, XP-002289086, Jan. 10, 1991, 1 page.

Patent Abstracts of Japan, JP 63-06316, Nov. 1, 1994.

* cited by examiner

*Primary Examiner*—J. A. Lorengo
*Assistant Examiner*—Veronica F. Faison
(74) *Attorney, Agent, or Firm*—Oblon, Spivak, McClelland, Maier & Neustadt, P.C.

(57) ABSTRACT

An ink composition for continuous deflected jet printing that is liquid at room temperature and that contains:
  a binder;
  one or more dyes and/or pigments; and
  a solvent;
wherein the said solvent contains more than 70% by weight—relative to the total weight of the ink—of propylene carbonate, and less than 10% by weight, preferably less than 5%, more preferably less than 1% and best 0% by weight of water.

27 Claims, No Drawings

INK COMPOSITION FOR CONTINUOUS DEFLECTED JET PRINTING, ESPECIALLY ON LETTERS AND POSTAL ARTICLES

The invention relates to an ink composition for marking of printing stock and articles of all kinds, wherein the properties are particularly well adapted to liquid jet marking or printing and especially to continuous deflected inkjet marking of a very large variety of both porous and nonporous printing stock.

This ink composition is particularly well suited to marking or cancellation of letters and postal packages, especially to marking or cancellation of stamps.

Inkjet printing is a well known technique, with which it is possible to print, mark or decorate all kinds of articles at high speed and without contact between these articles and the printing device, of messages that can be varied as desired, such as bar codes, sales limit dates, etc., even on printing stock that is not flat.

Inkjet printing systems are divided into two major categories: "drop on demand" (DOD) or "continuous jet" (CJ).

We are interested more particularly in the latter technique, and more precisely in the continuous deflected inkjet technique.

Spraying by continuous deflected jet consists of delivering ink under pressure into a cavity containing a piezoelectric crystal, from which the ink escapes through an orifice (nozzle) in the form of a jet. The piezoelectric crystal, vibrating at a known frequency, causes pressure fluctuations in the inkjet, which oscillates and breaks up progressively into spherical droplets. By means of an electrode placed on the jet trajectory where it breaks up, an electrostatic charge can be imparted to these drops if the ink is conductive. The drops charged in this way are deflected in an electric field enabling printing.

This type of jet spraying of ink ensures contactless marking at high run speed on articles that are not necessarily flat, and makes it possible to change the message as desired.

The ink compositions suitable for continuous deflected jet spraying must meet a certain number of criteria inherent to this technique and relating among others to viscosity, electrical conductivity, solubility in a cleaning solvent, compatibility of the ingredients, correct wetting of the printing stock to be marked, etc.

In addition, these inks must dry rapidly, be capable of passing through the nozzle without clogging it and must have great stability of orientation of the jet, while permitting easy cleaning of the printing head.

The ingredients that make up the current inks for inkjet printing of the continuous deflected type are organic or inorganic products, coloring materials such as dyes or pigments, resins or binders, in a more or less volatile solvent or solvents or in water, if necessary a conductivity salt or salts and various additives.

The possible conductivity salt(s) endows or endow the ink with the conductivity necessary for electrostatic deflection. More information on this subject can be found in U.S. Pat. No. 4,465,800.

The additives include surfactants that modify the wetting or penetrating power of the ink (U.S. Pat. No. 5,395,431), particularly those that modify or regulate the static or dynamic surface tension, such as Fluorad® FC 430 of the 3M® Co., agents that inhibit the corrosion induced by the salts mentioned hereinabove (see European Patent A 0510752 and U.S. Pat. No. 5,102,458), or even additives that protect the ink against proliferation of bacteria and other microorganisms, such as biocides, bactericides, fungicides and other agents, particularly useful in water-containing inks, pH-regulating buffers (see EP A 0735120) and anti-foaming agents.

The coloring materials are known as "dyes or pigments" depending on whether they are soluble or insoluble respectively in the solvent used.

The pigments, insoluble by nature, are therefore dispersed and may or may not be opaque. They endow the ink with its color, opacity or special optical properties, such as fluorescence (see patents or patent applications U.S. Pat. No. 4,153,593, U.S. Pat. No. 4,756,758, U.S. Pat. No. 4,880,465, EP A 0289141, U.S. Pat. No. 5,395,432 and GB A 2298713). In certain cases, the dyes themselves also endow the ink with sufficient conductivity that there is no need to add a conductivity salt. The dyes known by the name C. I. Solvent Black 27, 29, 35 and 45 are in this category.

In general, the binder(s) or resin(s) is/are for the most part a solid and polymeric compound or compounds, and the choice thereof is dictated by their solubility in the solvents selected and by their compatibility with the dyes and other additives, but also—and above all—as a function of the properties that they impart to the ink film once it is dry (see patents or patent applications U.S. Pat. No. 4,834,799, GB A 2286402, U.S. Pat. No. 5,594,044, U.S. Pat. No. 5,316, 575, WO A 96/23844 and WO A 95/29287).

Their primary function is to endow the ink with adherence to the maximum of printing stock or to specific printing stock, such as nonporous printing stock. They also make it possible to give the ink adequate viscosity for the formation of drops from the jet, and they endow the ink, or rather the resulting marking, with the basic properties of resistance to physical and/or chemical attacks.

The solvent of these inks is composed most often of a mixture containing, on the one hand, a majority content of volatile and slightly viscous solvents, in order to permit very rapid drying of the markings and to adjust the viscosity to the desired value, such as 2 to 10 mPa.s and, on the other hand, a lower content of more viscous and less volatile solvents that dry more slowly, in order to prevent drying of the ink in the nozzle during periods of inactivity of the printing machine (see patents or patent applications U.S. Pat. No. 4,155,767, WO A 92/14794, WO A 92/14795 and U.S. Pat. No. 4,260,531).

The most frequently used volatile solvents are low molecular weight alcohols, ketones or esters, as indicated in U.S. Pat. No. 4,567,213 and U.S. Pat. No. 5,637,139. Particular examples of these solvents are methanol, ethanol, 1-propanol, 2-propanol, acetone, methyl ethyl ketone ("MEK"), methyl isobutyl ketone, ethyl acetate and tetrahydrofuran.

U.S. Pat. No. 4,210,566 describes an ink based for the most part on n-propyl acetate.

Tetrahydrofuran is cited in U.S. Pat. No. 4,155,767 as an essential constituent (40 to 85%) of the solvent of an ink for inkjet printing.

U.S. Pat. No. 4,166,044 describes a binderless ink in which the solvent comprises water (10 to 35%), an alcohol (6 to 25%) and an organic compound which, for example, is generally chosen from among the cyclic ethers. This ink exhibits all the disadvantages associated with the presence of water.

Finally, Japanese Patent A 63-06316 describes an inkjet ink composition in which the solvent is water mixed with another solvent chosen from among 14 other compounds, including 1,3-dioxolane.

The less volatile solvents, whose function in particular is to retard drying, are most often ketones such as cyclohexanone, glycol ethers, as cited in U.S. Pat. No. 4,024,096 and U.S. Pat. No. 4,567,213, acetals such as tetrahydrofuran or dioxane, as cited in U.S. Pat. No. 4,155,767, dimethylformamide or dimethyl sulfoxide (U.S. Pat. No. 4,155,895), lactones (EP A 0034881), N-methylpyrrolidone (EP (A 0735120), glycols (WO A 96/23844), and even aliphatic hydrocarbons that additionally have the ability to penetrate oil films (U.S. Pat. No. 4,166,044), or even water, alone or in combination with other solvents cited hereinabove. More information in this regard can be found in the U.S. Pat. No. 4,153,593, GB A 2277094 and FR A 2460982.

In general, the principal or majority solvents of inks for continuous deflected jet spraying must meet a certain number of criteria. In particular:

their volatility must be sufficient that the ink dries rapidly on the printing stock to be marked, but must not be too great, to ensure that they do not evaporate too rapidly in the printer;

their solvent power with respect to the ink binders, dyes or pigment dispersions and with respect to the printing stock to be printed must be such that they are able to impart good adherence to the ink;

they must have the capacity of maintaining, in dissociated form, the ionic species (salts) that endow the ink with its electrical conductivity;

their effect on human health, or in other words their toxicity, noxiousness, irritating character and flammability, must be slight;

they must make it possible to maintain, in sterile condition, an ink that may be designed to be ingested.

None of the principal or majority solvents currently being used in inks for continuous jet printing simultaneously meets all of the criteria mentioned in the foregoing.

Thus methanol is toxic and has poor solvent power; ethanol is not sufficiently volatile, and its solvent power is not great enough; ethyl acetate and the other acetates have an extremely strong odor, which is an insurmountable defect in numerous applications; acetone is too volatile and its flash point is very low (−18° C.); methyl ethyl ketone ("MEK") has adequate solubility and good solvent power, but it is irritating, strong-smelling and highly flammable, with a flash point of −9° C., in addition to which it is even prohibited by the regulations of some countries; tetrahydrofuran (THF) is more volatile than methyl ethyl ketone, since its boiling point is 10° C. below that of methyl ethyl ketone, its flash point of −17° C. is almost as low as that of acetone, it can form explosive peroxides, it is irritating like methyl ethyl ketone, and inks containing more than 25% thereof must be labeled as irritants.

Because of their flammability, most of the solvents mentioned hereinabove (methanol, ethanol, methyl ethyl ketone, ethyl acetate, acetone) have a rating of ">2" for all the reference criteria of the NFPA ("National Fire Protection Association") of the United States.

Thus there exists a need—not yet fulfilled—for an ink composition that is suitable in particular for continuous deflected jet printing, especially on letters and other postal articles, wherein the solvent simultaneously meets the criteria mentioned hereinabove among others, with the consequence that the desired properties are imparted to the ink while the requirements, and in particular the regulatory requirements in the matter of toxicity, flammability and environmental protection, are satisfied.

It would be interesting to have a solvent capable of dissolving the dyes and other ingredients, while at the same time giving the ink especially its indelibility on substrates, and in particular on stamps.

There also exists a need for an ink that is suitable in particular for continuous deflected ink-jet printing and that permits rapid marking of all types of articles having different surface characteristics, both porous and nonporous.

The ink must also produce a marking that exhibits good adherence and good resistance to chemical attacks and, in general, it must exhibit all the properties, such as viscosity, resistivity, etc., usually required of inks for inkjet printers, especially for printers using the continuous jet technique.

The ink must also be capable of marking even scantly porous articles at high speed, while consistently achieving printing of excellent quality.

Finally, the ink must have the properties required (especially by the postal administrations of various countries) as regards indelibility of the printing achieved with the ink, for example on postal articles, letters and stamps.

The object of the invention is therefore to provide an ink composition that is suitable in particular for continuous deflected jet printing, while meeting, among other needs, all of the needs indicated hereinabove, satisfying the criteria and requirements mentioned hereinabove, not exhibiting the shortcomings, limitations, defects and disadvantages of ink compositions of the prior art, and overcoming the problem of prior art compositions related in particular to the nature of the solvent that they contain.

This and also other objects are achieved according to the invention by an ink composition for continuous deflected jet printing that is liquid at room temperature and that contains:

a binder;

one or more dyes and/or pigments; and a solvent;

in which composition the said solvent contains more than 70% by weight—relative to the total weight of the ink—of propylene carbonate, and less than 10% by weight of water.

By room temperature there is generally understood a temperature of 5 to 30° C., preferably 10 to 25° C., more preferably from 15 to 24° C. and best from 20 to 23° C. It is readily understood that the ink is liquid at atmospheric pressure.

Propylene carbonate is registered as CAS No. 108-32-7, and its structural formula is the following:

[see formula]

The ink according to the invention is a specific ink for continuous deflected inkjet printing, and it basically contains a specific solvent in specific proportions, but little or no water, and is liquid at room temperature.

No prior art document describes an ink that has all of these specific characteristics.

The invention is based on the surprising discovery that propylene carbonate permits the formulation of an ink that is particularly suitable for continuous deflected jet spraying, and that this is possible without adding, to the formulation, water or any other solvent that would significantly increase the dissociation of the ions necessary to the conductivity.

In the prior art, water is generally added to assist in the dissociation of the salts; according to the invention, and in surprising manner, the ink composition contains little or no water but nevertheless has sufficient conductivity by virtue of the dissociating action of the propylene carbonate.

In particular, it has been demonstrated according to the invention that, in completely surprising manner, propylene carbonate is a solvent whose dissolving and penetrating power is such that it permits the formulation of an ink composition that is suitable in particular for canceling letters and postal articles, while being conductive and therefore capable of being sprayed by continuous jet, even if it contains little or no water.

In an entirely astonishing manner, propylene carbonate, by virtue of its great penetration capacity—and despite its low volatility and very slow drying rate—permits the ink composition according to the invention to be used for high-speed printing of even scantly porous articles, especially substrates made of cellulose, such as the paper or cardboard making up letters, postal articles and stamps.

It is very surprising that a solvent having such low volatility as propylene carbonate assures a high printing speed, when precisely the opposite would be expected; this printing speed is permitted by the great penetration capacity of propylene carbonate and therefore of the ink containing it into the substrates.

From the known compositions, it did not follow in obvious manner that the choice of propylene carbonate (moreover in specific proportions) among the multiplicity of existing organic solvents could lead to an ink that satisfies all of the criteria, requirements and needs mentioned hereinabove, especially in relation to the nature of the solvent.

To the contrary, in this field of the art—which is that of inkjet printing—there exists a widespread strong preconception against the use of propylene carbonate as solvent, because not only does it have very low volatility but also it is highly polar.

The invention therefore overcomes a widespread preconception in this field of the art by using propylene carbonate as solvent in inks for ink-jet printing, and furthermore in very high proportions.

Propylene carbonate is cited only as having a plasticizing action (U.S. Pat. No. 6,558,770 and U.S. Pat. No. 6,460,957) or as cosolvent (U.S. Pat. No. 6,555,168) and U.S. Pat. No. 6,533,408) or as electrolyte (U.S. Pat. No. 6,501,587), as penetrant (U.S. Pat. No. 6,568,795, U.S. Pat. No. 6,554,418, U.S. Pat. No. 6,534,566, U.S. Pat. No. 6,527,844, U.S. Pat. No. 6,527,387) or else as coalescence promoter of systems based on dispersed polymers (latex) (U.S. Pat. No. 6,559,245).

Thus the use, in low-water-content ink compositions analogous to those of the invention, of propylene carbonate in the specific proportions according to the invention, particularly for continuous deflected jet printing, is neither described nor suggested in the prior art. In fact, the majority of patents or patent applications of the prior art mention the use of propylene carbonate only as a supplement in water-based inks.

Thus:

U.S. Pat. No. 4,281,329 relates to a "recording liquid medium", which is intended to be used exclusively in devices of the "drop-on-demand" type. It is never mentioned or suggested in that document that the medium could be used in other devices, and especially in continuous deflected jet printing devices.

That medium contains an ester of carbonic acid of general formula (A) or (B) as essential component.

These formulas, and in particular formula (B), which describes the cyclic esters of carbonic acid, cover a considerable number of compounds. Columns 5 to 8 cite 48 examples of particular compounds.

Propylene carbonate is used in the examples, but always in combination with large quantities of water and in devices of the "drop-on-demand" type. The specific critical proportion of higher than 70% according to the invention is not cited.

That document contains no suggestion leading to using the compounds of formula (B) and even less, from among all of them, propylene carbonate, in a water-free ink and in a specific ink for continuous deflected jet printing.

There is no indication in that document about the unexpected properties of propylene carbonate that have been demonstrated by the inventors, especially in relation to its great penetration capacity, which make it particularly suitable for use in an ink for continuous deflected jet printing.

In other words, U.S. Pat. No. 4,281,329 claims ink compositions containing up to 99.5% of propylene carbonate and a dye but no binder, but is unable to explain what components make it possible to achieve the conductivity necessary to continuous jet spraying. Furthermore, the inks of the examples all contain non-negligible contents of water, and none of those inks exhibits the capacity to be sprayed by continuous jet. Instead, they can be sprayed only by "drop-on-demand" jet.

U.S. Pat. No. B1 6,432,184 relates to an ink composition that contains a dye, a vehicle that may be propylene carbonate, and necessarily a light stabilizer, a compound known as an "anti-curl" agent and a poly(dialkyldialkylammonium chloride). That ink composition is used mainly in acoustic inkjet printing devices. No specific example using an ink containing propylene carbonate is given, and it is not mentioned that the inks can be used in continuous ink-jet printing machines.

Furthermore, no proportion of propylene carbonate is indicated in association with the properties.

In fact, the presence of the foregoing mandatory compounds and especially of poly(dialkyldialkylammonium chloride) in these inks makes them totally unsuitable for use in continuous jet printers.

In other words, U.S. Pat. No. 6,432,184 claims an ink containing propylene carbonate together with a light stabilizer and an "anti-curl" component, plus a diallyldialkyl halide that carries the risk of making the ink particularly corrosive to ferrous metals, and therefore unusable in industrial continuous jet printers. That patent does not give any practical example containing propylene carbonate.

U.S. Pat. No. B1 6,444,020 describes an azo dye and an inkjet printing ink containing the said dye.

Propylene carbonate is cited among a very large number of solvents, but no example of ink using it is cited.

In addition, that document does not indicate that these inks can be used in general in the continuous deflected jet technique, and even less that an ink containing propylene carbonate has the unexpected advantages according to the invention and is particularly suitable for the continuous deflected jet technique. Finally, no mention is made of a necessary specific proportion of propylene carbonate.

In other words, U.S. Pat. No. 6,444,020 describes an inkjet ink where the propylene carbonate can be used only to dissolve a specific dye, but it does not describe if or how this formulation could be sprayed by the continuous deflected jet technique. Nor does it describe how the composition can be made sufficiently conductive. No example is given to support the use of propylene carbonate.

U.S. Pat. No. 6,086,661 relates to an aqueous ink composition for inkjet printing that contains a quaternary ammonium compound, a liquid vehicle, a light-stabilizing compound, a light-stabilizing antioxidant, a salt, a biocide and a dye.

The vehicle is present in a content of 5 to 70% by weight, and in particular it may be propylene carbonate. Nevertheless, that document neither describes nor suggests the surprising advantages and beneficial effects obtained according to the invention with propylene carbonate in connection with an ink for continuous jet printing; furthermore, it does not indicate that these advantages could be obtained for a specific proportion of propylene carbonate greater than 70% by weight.

In addition, the compositions of that document contain neither resin nor polymer.

In other words, U.S. Pat. No. 6,086,661 describes an ink containing up to 70% of a vehicle that may be propylene carbonate, together with an organic or inorganic salt, a dye, an "anti-curl" agent, a light stabilizer, a biocide and a quaternary imidazolium, phosphonium or ammonium salt. That composition contains neither resin nor polymer.

U.S. Pat. No. 5,593,486 and U.S. Pat. No. 5,122,187 describe "hot-melt" ink compositions, which are therefore solid at room temperature, that may use propylene carbonate as "propellant". The solid inks are therefore unusable in continuous jets at room temperature.

In contrast to the compositions of the prior art, the ink composition according to the invention contains a very low water content of less than 10% by weight, preferably of less than 5%, and more preferably of less than 1% by weight relative to the total weight of the ink.

The ink composition according to the invention can be considered as being substantially free of water (0% of water).

In fact, the water that is present is merely stray water contained in the form of an impurity in the various components of the ink. Thus the water content is inversely proportional to the purity of the chosen components.

The low content or absence of water in the ink composition according to the invention favors high-speed printing, for which a very high evaporation rate is necessary.

The criteria and requirements defined as to the properties of a solvent for an ink composition for continuous jet spraying are met by propylene carbonate. Thus:

its boiling point is 230° C. and its flash point is 123° C., and so it is not classified among the flammable products within the meaning of transportation legislation; it must be pointed out that the flash point of the overall composition is generally higher than 60° C. because of this fact;

its volatility is 0.01 (that of butyl acetate being equal to 1), which is very low.

Its capacity for dissolving the majority of polymers is relatively low because of its very high polarity. Its capacity for dissolving polymers is not as general as that of other more volatile solvents, such as methyl ethyl ketone. Nevertheless, it completely dissolves polymers such as ketone, phenolic and cellulose resins, among others.

It is also astonishing that, despite this low solvent power for polymers, propylene carbonate nevertheless permits the formulation of inkjet inks that assure indelible printing of high quality.

Thus propylene carbonate dissolves a large number of resins or polymers serving as ink binder and assuring adherence to the printing stock to be marked.

Its capacity for dissolving dyes, especially of the C. I. solvent dye type, is excellent.

Propylene carbonate is a non-flammable product that is not noxious and is non-irritating.

In addition, propylene carbonate is rated "<2" for all the reference criteria of the NFPA ("National Fire Protection Association") of the United States. The odor of propylene carbonate is extremely faint, barely perceptible, and is not disagreeable.

According to a fundamental aspect of the invention, the inks according to the invention produce marking, printing and cancellation that are indelible according to the most stringent standards of the postal services of different countries. The use of ink containing propylene carbonate for these purposes is neither mentioned nor suggested in the prior art.

By means of propylene carbonate, it is possible to formulate inks whose functioning in continuous deflected inkjet printing does not necessitate the addition of a fluid (compound of the volatile fraction of the ink) to maintain the viscosity and composition constant. This type of fluid is commonly referred to by the person skilled in the art as "make-up ink" or additive, or adjuvant solvent.

Propylene carbonate is therefore superior to the principal solvents that have been most frequently used heretofore in ink compositions for continuous jet spraying.

In fact, propylene carbonate is more advantageous than:
methanol, which is toxic;
ethanol, which is more volatile and more flammable;
ethyl acetate or the other acetates, which have a very strong odor;
acetone, which is too volatile and has a very low flash point (−18° C.);
methyl ethyl ketone, which is irritating and has a very much lower flash point (−9° C.).

In addition, because of their flammability, all of the solvents cited hereinabove are rated ">2" for the reference criteria of the NFPA.

The ink composition according to the invention is also characterized by a specific proportion of propylene carbonate of greater than 70% by weight of the total weight of the ink.

It has been demonstrated that this proportion is critical if the ink composition according to the invention is to have all the effects and advantages described here, especially in relation to marking quality and indelibility.

Thus the composition according to the invention contains more than 70% by weight of propylene carbonate, preferably more than 80%, more preferably more than 85% and best more than 90% by weight of propylene carbonate.

In addition, the composition generally contains at most 97%, preferably at most 95% by weight of propylene carbonate.

A preferred range of the content of propylene carbonate will therefore be, for example, 90 to 95% by weight.

Preferably, the composition according to the invention generally contains up to 20% by weight, preferably 5 to 15% by weight of one or more other organic solvents different from propylene carbonate.

The said other organic solvent(s) forming part of the solvent(s) that is or are other than propylene carbonate is or are chosen, for example, from among alcohols, particularly low molecular weight alcohols such as the aliphatic alcohols; ketones; alkylene glycol ethers and the esters thereof, such as the acetates; dimethylformamide; N-methylpyrrolidone; and the carbonates other than propylene carbonate, such as ethylene carbonate and the dimethyl and diethyl carbonates; and mixtures thereof.

In general, the content of the other organic solvent(s) that is or are other than propylene carbonate is chosen in such a way that the flash point of the overall composition remains higher than 60° C.

Preferably, the said other organic compound(s) forming part of the solvent is or are organic solvents whose volatility is higher than that of propylene carbonate.

Preferably, this or these other solvent(s) additionally has or have the property of dissolving the other ingredients of the ink, especially the binder, the dye materials, the additives, etc.

The alcohols will be preferably chosen from among the straight-chain or branched aliphatic alcohols containing 1 to 5 carbon atoms, such as methanol, ethanol, 1-propanol, 2-propanol, n-butanol, 2-butanol, tert-butanol, etc.

The ketones will be preferably chosen from among the ketones containing 3 to 10 carbon atoms, such as acetone, butanone (methyl ethyl ketone), 2-pentanone (methyl propyl ketone) and 4-methyl-2-pentanone (methyl isobutyl ketone).

The alkylene glycol ethers are chosen from among the mono-(C1 to C6)-alkyl or di-(C1 to C6)-alkyl ethers of alkylene glycol containing 1 to 10 carbon atoms in the alkylene chain. Preferred are ethylene or propylene glycol ethers, such as methoxypropanol.

The glycol ether esters are preferably chosen from among the esters thereof with saturated aliphatic carboxylic acids containing 1 to 6 carbon atoms, such as formic acid, acetic acid, propionic acid, butyric acid, valeric acid and caproic acid. As examples, there can be cited methoxypropyl acetate, butyldiglycol acetate, etc.

The ink composition according to the invention also contains a binder comprising one or more polymers and/or resins.

These polymers and/or resins are preferably chosen from among the (meth)acrylic, vinyl, ketone, phenol, cellulose, styrene and epoxy resins, the polyurethanes, the styrene acrylates and the combinations of two or more of the foregoing.

Examples of these resins are the following:

For the acrylic, methacrylic and styrene acrylate resins, the Joncryl® resins of the JOHNSON POLYMER Co., the Acryloid® resins of the ROHM & HAAS Co., the SMA® resins of the ATOCHEM Co. or the Neocryl® resins of ZENECA.

For the vinyl resins, the Hostaflex® resins of the VIANOVA Co., the Vinylite® resins of UNION CARBIDE or the Vinnol® resins of WACKER.

For the ketone resins, the products offered by the HULS and BASF Cos., such as the resins designated AP and SK of HULS and the LAROPAL® resins of BASF.

For the phenol resins, the products offered by the VIANOVA Co. under the name ALNOVOL®.

Among the cellulose resins, such as the nitrocelluloses, the ethylcelluloses and the cellulose acetopropionates or acetobutyrates, there can be cited, for example, the products offered by the Aqualon or EASTMAN Cos.

Among the epoxy resins, there can be cited the Epikote® resins offered by the SHELL Co. or the Araldite resins of CIBA.

Among the polyurethanes there can be cited the Surkopak® resins of the MITCHANOL Co.

The proportion of binder in the ink composition according to the invention is generally from 0.1 to 30% by weight, preferably from 1 to 25% by weight, more preferably from 3 to 20% by weight.

The ink composition may additionally contain one or more plasticizers (of the resin(s) or polymer(s) of the binder) chosen, for example, from among the plasticizers known to the person skilled in the art, and also chosen as a function of the binder used, the binder containing one or more polymers and/or resins. As examples of plasticizers there can be cited the thermoplastic polyurethanes.

Because of the solvent power of propylene carbonate, it is easily possible to incorporate such plasticizing compounds in the composition of the invention.

Because of the solvent power of propylene carbonate, it is easily possible to incorporate such plasticizing compounds in the composition of the invention.

The plasticizer or plasticizers is or are generally present in a proportion of from 0.1 to 20% by weight.

The dye(s) and/or pigment(s) may be chosen from among all the dyes or pigments suitable for the intended use and known by the person skilled in the art. Some of these pigments or dyes have already been cited hereinabove.

They will generally be chosen from among the dyes and pigments known under the name of "C. I. Solvent Dyes" and "C. I. Pigments".

As examples of the most common pigments and dyes there can be cited C. I. Solvent Black 29, C. I. Solvent Black 7, C. I. Solvent Black 28, C. I. Solvent Black 35, C. I. Solvent Blue 70, C. I. Solvent Red 124 and the dispersions of Pigment Blue 60 or of Pigment Blue 15.

The total content of dye(s) and/or of pigment(s) generally ranges from 0.05 to 25% by weight, preferably from 1 to 20% and more preferably from 3 to 10% of the composition.

By virtue of the capacity of propylene carbonate to dissolve dye(s) in larger content than in the usual solvents, and in particular the dyes that are most resistant to water, it is possible in particular, in the case of a fluorescent dye, to obtain particularly fluorescent inks, or in other words inks that are visible under weak UV lighting.

In addition, the composition according to the invention may contain at least one conductivity salt if necessary.

In fact, since the ink according to the invention is applicable by a continuous jet, it must have a sufficient electrical conductivity, generally greater than 300 µS/cm at 20° C., preferably on the order of 500 to 2000 µS/cm or greater (at 20° C.).

Compared with other solvents, propylene carbonate favors conductivity by assisting in the dissociation of the ions contained in the ink, and accordingly the quantities of conductivity salts (see hereinafter) can be reduced.

As the products that endow the ink with the conductivity necessary to continuous jet spraying are ionizable compounds such as salts, it is possible that the dyes already present in the ink impart sufficient conductivity thereto that there is no need to add conductivity salt proper: this is the case of the already cited compounds known under the name "C. I. Solvent Black 27, 29, 35 and 45".

However, it will often be necessary to include, in the ink composition, a conductivity salt that is different from the dyes and that is generally chosen from among the salts of alkali metals, alkaline earths and simple or quaternary ammonium, in the form of halides (chlorides, bromides, iodides, fluorides), perchlorates, nitrates, thiocyanates, formates, acetates, sulfates, propionates, hexafluorophosphates, hexafluoroantimonates, etc.

These conductivity salts will therefore be present if necessary in the ink composition in such a way as to endow the ink with the foregoing conductivity: their content is preferably from 0.1 to 20% by weight, more preferably from 0.1 to 10% by weight and best from 0.1 to 5% by weight.

The composition according to the invention may in addition contain one or more additives chosen from among the compounds that improve the solubility of some of these components as well as the printing quality, the adherence or even the control of how well the ink wets different printing stock.

It will be possible to choose the additive(s) from among, for example, anti-foaming agents, chemical stabilizers, UV stabilizers; surfactants such as Fluorad® FC 430, agents for stabilizing against corrosion by salts, bactericides, fungicides and biocides, pH-regulating buffers, etc.

The additive(s) is or are used in very low proportions, generally lower than or equal to 5% and sometimes as low as 0.01%, depending on whether they are anti-foaming agents, stabilizers or surfactants.

Another object of the invention is a method for marking of articles, such as porous or nonporous articles, by spraying an ink composition such as described hereinabove on articles. Marking is achieved by the continuous deflected jet technique.

Yet another object of the invention is a substrate or printing stock, for example porous or nonporous, provided with a marking obtained by drying the ink composition such as described hereinabove.

This substrate can be of metal, such as aluminum, of steel (beverage cans), of glass (glass bottles), of ceramic, or a cellulose-containing material such as paper, cardboard or wood, of synthetic polymer ("plastic") such as PVC or PET, of polyolefin such as polyethylene (PE) or polypropylene (PP), of "Plexiglass" or of any other nonporous or porous substance or composite of a plurality of the foregoing materials.

A preferred application according to the invention is the marking, printing or cancellation of postal articles, letters and packages. The substrate is then a substrate containing cellulose, preferably a substrate made mainly or completely of cellulose, such as paper (possibly coated, glazed or otherwise treated) or cardboard. The substrate on which cancellation or printing is performed can be, for example, a postal stamp or other official sticker (more precisely, the surface thereof that remains free and is exposed when it has been applied onto, for example, a postal article, a package or a letter).

Marking and printing of excellent quality are achieved on all substrates, even those that have very low porosity.

In the preferred application according to the invention, excellent quality of printing, marking and cancellation of the postal article or letter is achieved. For example, excellent quality of cancellation of stamps is achieved regardless of the surface quality thereof (smooth, glazed, etc.).

In addition, according to a basic advantage of the composition according to the invention, the marking, printing or cancellation achieved on the substrate, such as a postal article, a letter and in particular a stamp, is indelible.

By indelible it is generally understood that the printing, marking or cancellation performed is not substantially eliminated from the substrate such as a postal article, letter or stamp by even prolonged immersion (meaning several hours or days, an example being about 24 hours) in diverse aqueous and organic solutions, such as demineralized water, alcohols such as ethanol and methanol, methyl ethyl ketone, hexane, toluene, dimethylformamide, aqueous alkaline solution of pH 11, 8% aqueous bleach and disinfectant solution, etc.

The invention will be better understood by reading the following description of embodiments of the invention, given by way of illustrative and non-limitative examples.

The following ink compositions according to the invention were prepared by mixing the products mentioned in Table I in the indicated proportions. The viscosity and conductivity of the inks obtained are also listed.

TABLE I

| Constituents (percentages by mass) | No. 1 | No. 2 | No. 3 | No. 4 | No. 5 |
|---|---|---|---|---|---|
| Pure propylene carbonate (>99%) | 85.5 | 91.4 | 88.9 | 83 | 82.9 |
| Diethylene glycol ethyl ether | | | | | 9 |
| Dipropylene glycol | 5 | | 5 | | |
| Tripropylene glycol methyl ether (Dowanol® TPM) | | | | 8 | |
| Solvent black 3 black with grease (Oil black® 860, Orient Chemicals) | | | 3 | 1 | |
| Solvent Black 29 (Orasol® black RLI) | 5 | | | 4.9 | 4 |
| Solvent Black 7 (Nigrosine base) | | 4 | | | 1 |
| Solvent Black 28 (Orasol Black CN) | 1 | | 2 | | |
| Phenol resin (PN 320 of Solutia) | 3 | | | | |
| Phenol resin (PN 630 of Solutia) | | | | | 2 |
| Ketone resin (SK resin - Hüls) | | 4 | | | |
| Nitrocellulose (E15 of Bergerac NC) | | | | 2 | |
| Sodium thiocyanate | 0.5 | | | | |
| Potassium hexafluorophosphate | | | | 1 | 1 |
| Ammonium hexafluorophosphate | | 0.5 | 1 | | |
| Surfactant (Fluorad® FC430) | 0.1 | 0.1 | 0.1 | 0.1 | 0.1 |
| Viscosity (mPa · s) | 5.2 | 4.4 | 3.9 | 6.4 | 5.1 |
| Conductivity (μS/cm) | 750 | 710 | 1180 | 1040 | 1160 |

The compositions according to the invention, shown in Table I, do not contain more than 4% by mass of water, which seems to be due to the water that is present as an inevitable impurity.

Each of these examples yields stable inks.

The inks prepared in this way were tested in Imaje® printers of the Series 7 type, and made it possible to obtain printing of excellent quality.

The printing performed on stamps was as least as resistant as the inks of the stamps themselves to all kinds of aqueous and organic solutions, such as:

Demineralized water, methanol, ethanol, methyl ethyl ketone, hexane, toluene, dimethylformamide, aqueous alkaline solution of pH 11 and 8% aqueous bleach and disinfectant solution.

The inks of Examples 1 to 5 according to the invention were sprayed by ink jet in Imaje® printers of the Jaime® 1000 type onto USA stamps.

The printed messages were a succession of points in a straight line.

The stamps were the following:
US 37 cents ("Star-Spangled Banner")
23 cents ("George Washington")
37 cents ("Happy Birthday")
37 cents ("American Bat")
37 cents ("Chinese New Year 2003")
3 cents ("Star")

Even after prolonged immersion, none of the different aqueous solutions and none of the organic solvents was able to dissolve the markings without damaging the stamps themselves.

The invention claimed is:

1. An ink composition comprising:
a binder;
one or more dyes and/or pigments; and
a solvent;

wherein the solvent comprises more than 70% by weight, relative to the total weight of the ink, of propylene carbonate, and less than 10% by weight of water, wherein said ink is liquid at room temperature and is formulated such that it is suitable for continuous deflected jet printing.

2. An ink composition according to claim 1, comprising more than 80% by weight of propylene carbonate.

3. An ink composition according to claim 1, comprising at most 97% by weight of propylene carbonate.

4. A composition according to claim 1, wherein the flash point is higher than 60° C.

5. A composition according to claim 1, containing a positive amount up to 20% by weight of one or more other organic solvents different from propylene carbonate.

6. An ink composition according to claim 5, wherein the said organic solvent(s) is or are chosen from alcohols; ketones; alkylene glycol ethers and the esters thereof; dimethylformamide; N-pyrrolidone; and carbonates other than propylene carbonate, and mixtures thereof.

7. A composition according to claim 5, wherein the said other organic solvent(s) is or are chosen from straight-chain or branched aliphatic alcohols containing 1 to 5 carbon atoms; ketones containing 3 to 10 carbon atoms; mono-(C1 to C6)-alkyl or di-(C1 to C6)-alkyl ethers of alkylene glycols containing 1 to 10 carbon atoms in the alkylene chain; and the esters thereof with saturated aliphatic carboxylic acids containing 1 to 6 carbon atoms.

8. A composition according to claim 5, wherein the flash point of the composition is higher than 60° C.

9. An ink composition according to claim 1, wherein the binder comprises one or more resins and/or polymers.

10. A composition according to claim 9, wherein the said resin(s) and/or polymer(s) is or are chosen from (meth)acrylic, vinyl, ketone, phenol, cellulose, styrene and epoxy resins, polyurethanes, styrene acrylates and combinations of two or more thereof.

11. An ink composition according to claim 1, comprising from 0.1 to 30% by weight of binder.

12. An ink composition according to claim 1, further comprising one or more plasticizers in a proportion of from 0.1 to 20% by weight.

13. An ink composition according to claim 1, wherein the said dye(s) and/or pigment(s) is or are chosen from dyes and pigments known under the names "C. I. Solvent Dyes" and "C. I. Pigments."

14. A composition according to claim 1, comprising from 0.05 to 25% by weight of dye(s) and/or pigment(s).

15. A composition according to claim 1, further comprising at least one conductivity salt in a proportion of from 0.1 to 20% by weight based on the total weight of the ink.

16. An ink composition according to claim 15, comprising at least one conductivity salt chosen from salts of alkali metals, alkaline earths and simple or quaternary ammonium, in the form of halides, perchlorates, nitrates, thiocyanates, formates, acetates, sulfates, propionates, hexafluorophosphates, hexafluoroantimonates and propionates.

17. An ink composition according to claim 1, having a conductivity of greater than 80 µS/cm at 20° C.

18. An ink composition according to claim 1, further comprising one or more additives selected from anti-foaming agents, chemical stabilizers, UV stabilizers, surfactants, agents for inhibiting corrosion by salts; bactericides, fungicides, biocides, and pH-regulating buffers.

19. A method for marking, comprising applying the ink of claim 1 to a substrate by continuous deflected jet printing.

20. The method according to claim 19, wherein the substrate is made of metal, glass, ceramic, a cellulose-containing material which may be coated or glazed, cardboard, wood, or synthetic polymer.

21. The method according to claim 19, wherein the substrate is a postal article, a letter, a package or a postal stamp.

22. An ink composition according to claim 1, comprising less than 1% water and more than 90% by weight of propylene carbonate.

23. An ink composition according to claim 1, comprising at most 95% by weight of propylene carbonate.

24. An ink composition according to claim 1, comprising 5 to 15% by weight of one or more other organic solvents different from propylene carbonate.

25. An ink composition according to claim 1, comprising 3 to 20% by weight of binder.

26. An ink composition according to claim 1, comprising 3 to 10% by weight of dye(s) and/or pigment(s).

27. An ink composition according to claim 1, having a conductivity of 500 to 2000 µS/cm.

* * * * *